US009432629B2

(12) United States Patent
Olsen, Jr.

(10) Patent No.: US 9,432,629 B2
(45) Date of Patent: Aug. 30, 2016

(54) INTERACTIVE VIEWING OF SPORTS VIDEO

(75) Inventor: Dan R. Olsen, Jr., Provo, UT (US)

(73) Assignee: Brigham Young University, Provo, UT (US)

( * ) Notice: Subject to any disclaimer, the term of this patent is extended or adjusted under 35 U.S.C. 154(b) by 253 days.

(21) Appl. No.: 12/542,909

(22) Filed: Aug. 18, 2009

(65) Prior Publication Data

US 2010/0043040 A1 Feb. 18, 2010

Related U.S. Application Data (60) Provisional application No. 61/189,395, filed on Aug. 18, 2008.

(51) Int. Cl.
*H04N 21/2387* (2011.01)
*H04N 21/434* (2011.01)
*H04N 21/43* (2011.01)
*H04N 21/44* (2011.01)
*H04N 21/443* (2011.01)
*H04N 21/472* (2011.01)
*H04N 21/6587* (2011.01)
*H04N 7/173* (2011.01)

(52) U.S. Cl.
CPC ...... *H04N 7/17318* (2013.01); *H04N 21/2387* (2013.01); *H04N 21/4307* (2013.01); *H04N 21/4347* (2013.01); *H04N 21/44012* (2013.01); *H04N 21/4438* (2013.01); *H04N 21/47202* (2013.01); *H04N 21/47217* (2013.01); *H04N 21/6587* (2013.01)

(58) Field of Classification Search
CPC .................. H04N 21/4347; H04N 21/4307; H04N 21/4438; H04N 21/44012; H04N 21/2387; H04N 21/47202; H04N 21/47217; H04N 21/6587

USPC .................................... 725/32, 37, 88, 135
See application file for complete search history.

(56) References Cited

U.S. PATENT DOCUMENTS

| | | | |
|---|---|---|---|
| 6,005,600 A * | 12/1999 | Hill ............................... 725/134 |
| 6,993,789 B1 * | 1/2006 | Sezan .................. H04N 21/235 |
| | | | 375/E7.024 |
| 7,073,129 B1 * | 7/2006 | Robarts et al. ............... 715/740 |
| 8,087,054 B2 * | 12/2011 | Zacks et al. .................... 725/86 |
| 2002/0015099 A1 | 2/2002 | Igarashi |
| 2002/0133506 A1 * | 9/2002 | Yamato ............................ 725/9 |
| 2002/0157099 A1 | 10/2002 | Schrader et al. |
| 2002/0157101 A1 * | 10/2002 | Schrader et al. ............... 725/64 |
| 2002/0166123 A1 * | 11/2002 | Schrader et al. ............... 725/52 |
| 2002/0170068 A1 * | 11/2002 | Rafey et al. .................. 725/112 |
| 2003/0005074 A1 * | 1/2003 | Herz et al. .................... 709/216 |
| 2003/0093790 A1 * | 5/2003 | Logan et al. .................. 725/38 |

(Continued)

OTHER PUBLICATIONS

Stefan Agamanolis, V. Michael Bove Jr., Viper: A Framework for Responsive Television, IEEE MultiMedia, v.10 n.3, p. 88-98, Jul. 2003.

(Continued)

*Primary Examiner* — Randy Flynn (57) ABSTRACT

A primary video stream of a sporting event may be provided via the Internet. In addition, at least one secondary video stream of the sporting event may be provided via the Internet. Moreover, metadata corresponding to the primary video stream and the at least one secondary video stream may be provided via the Internet. The primary video stream, the at least one secondary video stream, and the metadata may be utilized to provide interactive viewing of the sporting event.

6 Claims, 9 Drawing Sheets

(56) References Cited

U.S. PATENT DOCUMENTS

| | | | |
|---|---|---|---|
| 2003/0163832 A1* | 8/2003 | Tsuria et al. | 725/135 |
| 2005/0005308 A1 | 1/2005 | Logan et al. | |
| 2005/0028219 A1* | 2/2005 | Atzmon et al. | 725/116 |
| 2005/0132401 A1* | 6/2005 | Boccon-Gibod et al. | 725/34 |
| 2005/0154637 A1* | 7/2005 | Nair et al. | 705/14 |
| 2005/0172332 A1* | 8/2005 | Fukuda et al. | 725/139 |
| 2005/0198570 A1 | 9/2005 | Otsuka et al. | |
| 2007/0277214 A1* | 11/2007 | Kim et al. | 725/131 |
| 2008/0196058 A1* | 8/2008 | Terada et al. | 725/32 |
| 2008/0319827 A1* | 12/2008 | Yee et al. | 705/10 |
| 2009/0064249 A1* | 3/2009 | Haynes et al. | 725/109 |
| 2009/0222851 A1* | 9/2009 | Talmi | 725/32 |
| 2009/0292819 A1* | 11/2009 | Kandekar et al. | 709/231 |
| 2009/0328087 A1* | 12/2009 | Higgins et al. | 725/10 |
| 2010/0048187 A1* | 2/2010 | Sullivan | 455/414.3 |

OTHER PUBLICATIONS

Arman, F. Depommier, R. Hsu, A. and Chiu, M. "Content-based browsing of video sequences." In Proceedings of the second ACM international conference on Multimedia '94, 1994.

Babaguchi, N., Kawai, Y., Ogura, T., Kitahashi, T. Personalized abstraction of broadcasted American football video by highlight selection. Dept. of Commun. Eng., Osaka Univ., Japan. Multimedia, IEEE Transactions on. Aug. 2004.

Bobick, Aaron F., "Representational Frames in Video Annotation." IEEE 1993.

Chambel, Teresa, and Guimaraes, Nuno, "Context Perception in Video-Based Hypermedia Spaces." Conference on Hypertext and HyperMedia, 2002.

Chorianopoulos, Konstantinos, and Spinellis, Diomidis, "Affective Usability Evaluation for an Interactive Music Television Channel." ACM Computers in Entertainment, Jul. 2004.

Wei-Ta Chu, Ja-Ling Wu. Exploring Broadcasting Baseball Videos Based on Multimodal and Multidisciplinary Study. Multimedia and Expo, 2007 IEEE International Conference on. Jul. 2-5, 2007.

Davis, Marc, "Media Streams: An Iconic Visual Language for Video Annotation." IEEE 1993.

Drucker, Steven M. Glatzer, Asta De Mar, Steven and Wong, Curtis "SmartSkip: consumer level browsing and skipping of digital video content." Proceedings of the SIGCHI conference on Human factors in computing systems: Changing our world, changing ourselves, Minneapolis, Minnesota, USA, 219-226 2002.

Girgensohn, Andreas, Wilcox, Lynn, Shipman, Frank, and Bly, Sara, "Designing affordances for the navigation of detail-on-demand hypervideo." Proceedings of the working conference on Advanced visual Interfaces, 2004.

Jens F. Jensen, Interactive television: new genres, new format, new content, Proceedings of the second Australasian conference on Interactive entertainment, p. 89-96, Nov. 23-25, 2005, Sydney, Australia.

Li, Francis C., Gupta, Anoop, Sanocki, Elizabeth, He, Li-wei, and Rui, Yong, "Browsing Digital Video." Conference on Human Factors in Computing Systems, 2000.

Lin, C.C. and Chen, M.S. 2005. "On controlling digital TV set-top-box by mobile devices via IP networks." Proceedings of the IEEE International Symposium on Multimedia, 2005.

Rahul Nair, Calculation of an aggregated level of interest function for recorded events, Proceedings of the 12th annual ACM international conference on Multimedia, Oct. 10-16, 2004, New York, NY, USA.

Nichols, J., Myers, B., Higgins, M., Hughes, J., Harris, T., Rosenfeld, R., and Pignol, M., "Generating remote control interfaces for complex appliances." Proceedings of the ACM Annual Symposium on User Interface Software and Technology, ACM, New York, 2002.

Pose, Ronald, "Steerable Interactive Television: Virtual Reality Technology Changes User Interfaces of Viewers and of Program Producers." IEEE 2001.

Robertson, S., Wharton, C., Ashworth, C., and Franzke, M., "Dual device user interface design: PDAs and interactive television." Proceedings of the SIGCHI Conference on Human Factors in Computing Systems, 1996.

Wei Qi, Lie Gu, Hao Jiang, Xiang-Rong Chen and Hong-Jiang Zhang "Integrating Visual, Audio And Text Analysis For News Video",(Invited Paper), 7th IEEE Intn'l Conference on Image Processing (ICIP 2000), Vancouver, British Columbia, Canada, Sep. 10-13, 2000.

* cited by examiner

|  | Organization | Navigation | Scoring | Event / Info | Statistics |
|---|---|---|---|---|---|
| American Football | Play<br>Series<br>Quarter<br>Half<br>Game | Play<br>Series | Touchdown-6<br>Field Goal-3<br>Safety-2<br>2 Pt. Conv.-2<br>Extra Point-1 | Penalty<br>Fumble<br>Interception<br>Yard Marker<br>1st Down Marker<br>Pass Complete<br>Rushing Attempt<br>Yards Gained<br>..... | Score<br>Offensive Yards<br>Penalties<br>Turnovers<br>Rushing Yards<br>Passing Yards<br>Pass Completions<br>..... |
| Baseball | Pitch<br>Batter<br>Top/Bottom<br>Inning<br>Game | Pitch<br>Batter<br>Top/Bottom | Run-1 | Error<br>Out<br>Stolen Base<br>Hit<br>Ball<br>Strike<br>Foul Ball<br>Double Play<br>Triple Play<br>.... | Score<br>Outs<br>Count<br>Errors<br>Runs Batted In |
| Volleyball | Serve<br>Sideout<br>Game<br>Match | Serve<br>Sideout<br>Game | Point-1 | Fault<br>Spike<br>Out<br>Net Violation<br>.... | Score<br>Spikes |

Volleyball - Possession: BYU

- Set
- Defensive Point
- Defensive Kill
- Defensive Error
- Defensive Block
- Defensive Assist
- Defensive Dig
- Offensive Point
- Offensive Kill
- Ace
- Service Error
- Offensive Error
- Offensive Block
- Offensive Assist
- Offensive Dig

[Replay Clip] [⏸] [Log Clip] [Clear Stats]

BYU Serving - BYU: 0, CBU:0

Basketball - Possession: BYU

- 3 Points
- 2 Points
- 1 point
- Missed Shot
- Block
- Assist
- Defensive Rebound
- Offensive Rebound
- Steal
- Offensive Foul
- Defensive Foul

[Replay Clip] [⏸] [Log Clip] [Clear Stats]

BYU: 0, CBU:0

FIG. 13

INTERACTIVE VIEWING OF SPORTS VIDEO

RELATED APPLICATIONS

This application is related to and claims priority from U.S. Provisional Patent Application No. 61/189,395 filed Aug. 18, 2008, for "Time Warp Sports," with inventor Dan R. Olsen, Jr., which is incorporated herein by reference.

TECHNICAL FIELD

The present disclosure relates generally to computers and computer-related technology. More specifically, the present disclosure relates to interactive viewing of sports video.

BACKGROUND

Television is a powerful cultural force, yet television is a relatively inflexible medium. Viewer choice is confined to deciding whether to watch at all, selecting from at most a few hundred choices and the adaptation of their personal life to the broadcast schedule. The advent of the digital video recorder (DVR) has provided viewers with freedom of timing. In addition, DVRs provide viewers with pause, rewind or fast forward. DVRs give viewers more control but do not significantly change the nature of that viewing experience.

The advent of video over the Internet is starting to change the control relationship between viewer and broadcaster. Early Internet video systems were characterized by long waits for buffers to fill, low resolution and limited ability to select parts of a video stream to watch. However, bandwidth has improved sharply and video protocols have greatly improved. It is now possible to watch video over the Internet that has the following key attributes: high definition (HD) resolution, video startup of just a few seconds, delivery over a digital network to a computing device rather than an analog tuner, and the ability to jump to any point in a video stream in less than two seconds. The immediate benefit of these developments is that viewers can now watch what they want, whenever they want, outside of the control of large institutional gatekeepers. These are great developments, but much more is possible.

DETAILED DESCRIPTION

The embodiments disclosed herein relate to the interactive exploitation of randomly accessible Internet video streams. More specifically, the embodiments disclosed herein relate to providing interactive viewing of sports video over the Internet where the viewer is not required to prerecord games of interest.

Figure 1:
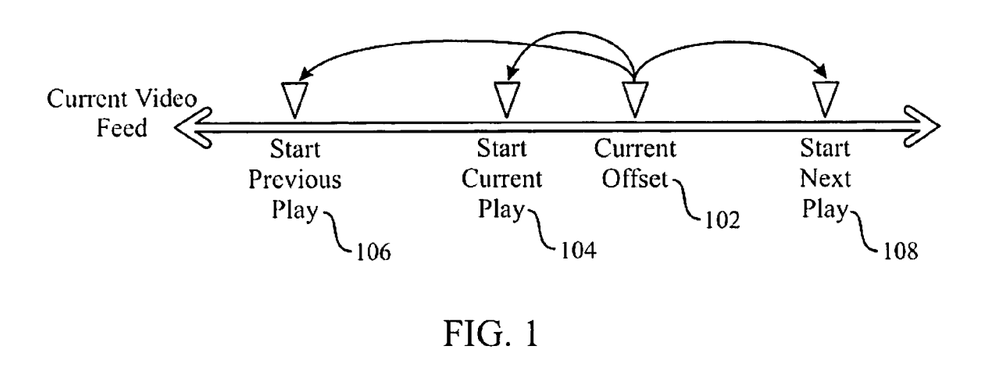
FIG. 1 illustrates an example of various offsets that may be identified in a video feed of a sporting event.

Reference is made to FIG. 1. Video can be understood as a flow of images through time. At any point in a viewing experience there is a current offset 102 or current position in the timeline which represents the current frame being displayed. Such offsets can be represented as time in seconds from the start of the video or as number of frames from the start. For a current offset 102 there are one or more other offsets in the video stream that are of potential interest to the viewer. FIG. 1 shows the sports example where the other offsets are the start of the current play 104, the start of the previous play 106 and the start of the next play 108. User interactions may include skipping from the current offset 102 to some other offset of interest, possibly in a different video stream.

Skipping from the current offset 102 to some other offset of interest requires that the other points of interest have been identified in some way. In the example of FIG. 1 each point of interest is the start of a play. The points of interest may be marked manually. Alternatively, automatic scene/play detection may be used.

Figure 2:
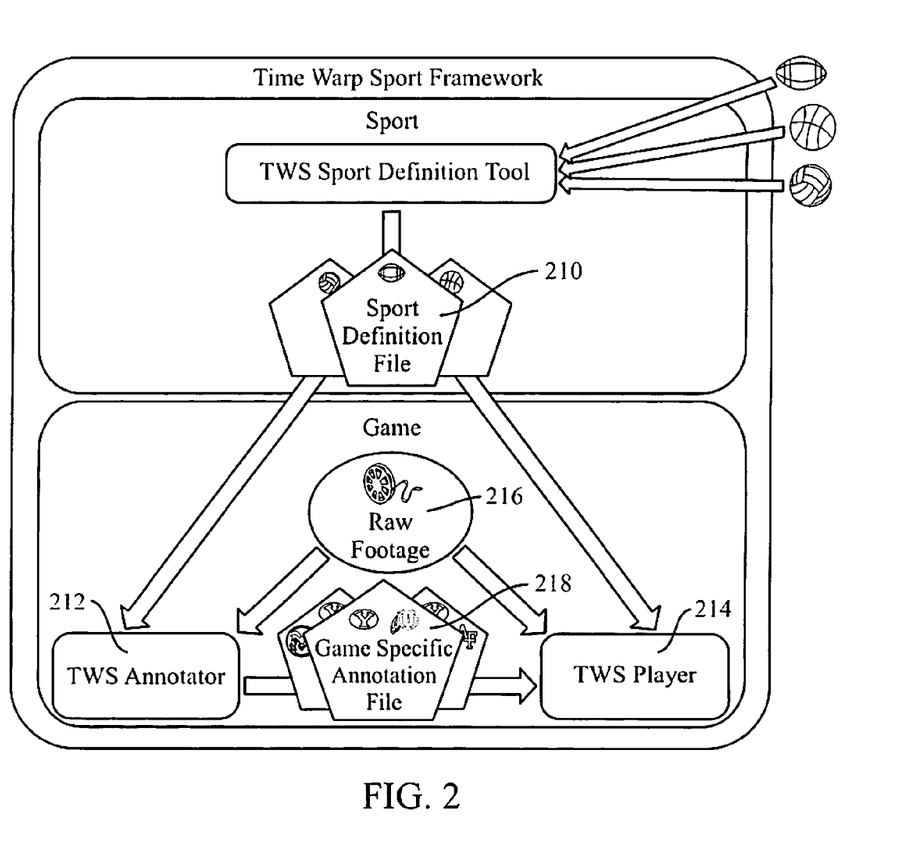
FIG. 2 illustrates an example of a framework for facilitating interactive viewing of sports video.

Reference is now made to FIG. 2. For each sport a sport definition file 210 may be created that contains information about the structure of the sport. This file need only be created once for each sport and serves to specialize the user interface of the annotation software 212 and the user interface of the player software 214 to that particular sport.

Given a sport definition file 210, a game may be created using the raw video footage 216 from all of the camera feeds by using annotator software 212. The annotator 212 may accept the sport definition file 210 and specialize its user interface to meet the specific needs of that sport. Using the annotator 212, broadcast personnel may produce annotation information 218 for a particular game.

In one implementation, the video streams (raw footage) 216 may be ingested onto a network server. The game annotation file 218 may be thought of as including metadata about the game. The game annotation file 218 contains information about teams/individuals playing, play boundary times, what happens during the plays, etc. Stated another way, the game annotation file 218 may include a set of time offsets from the beginning of the game, where each time event may include the type of event (e.g., start of play, end of play, end of quarter, change of possession, etc.), as well as additional data about the event (e.g., yards gained, score, penalties, participants, etc.). The player 214 may use a network protocol to fetch the game annotation file 218 and the relevant video 216 to present to the viewer. HTTP is an example of such a protocol.

Figure 3:
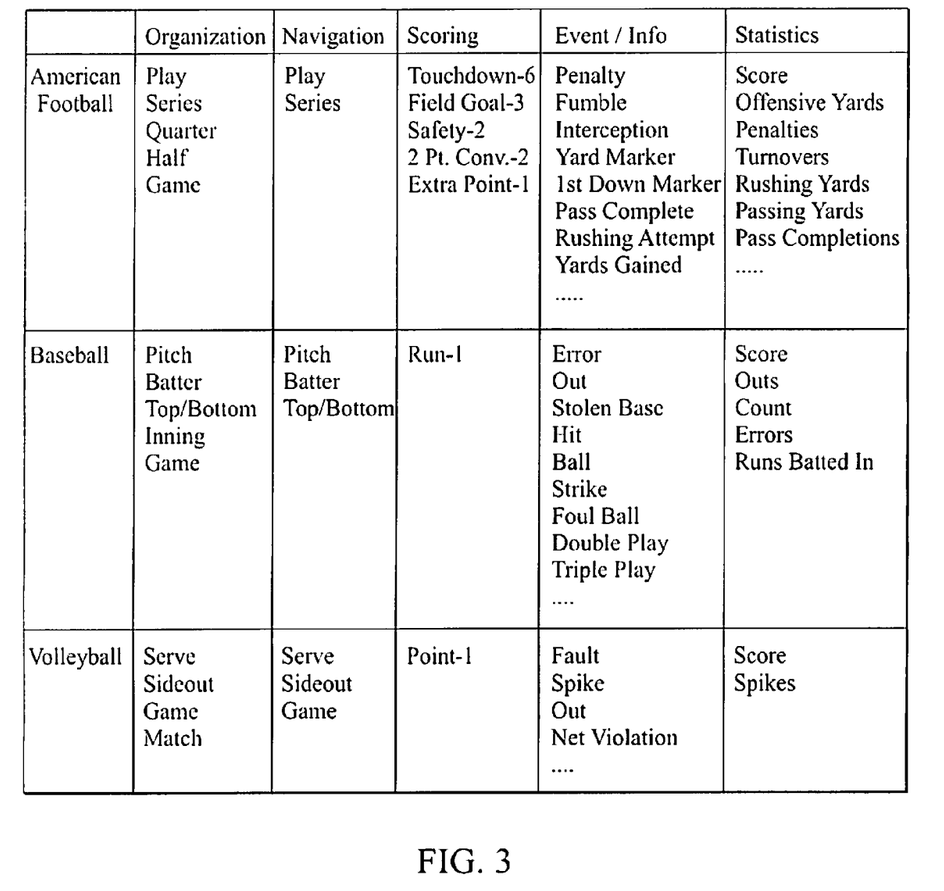
FIG. 3 illustrates an example of an analysis of the structure of three different sports.
Figure 4:
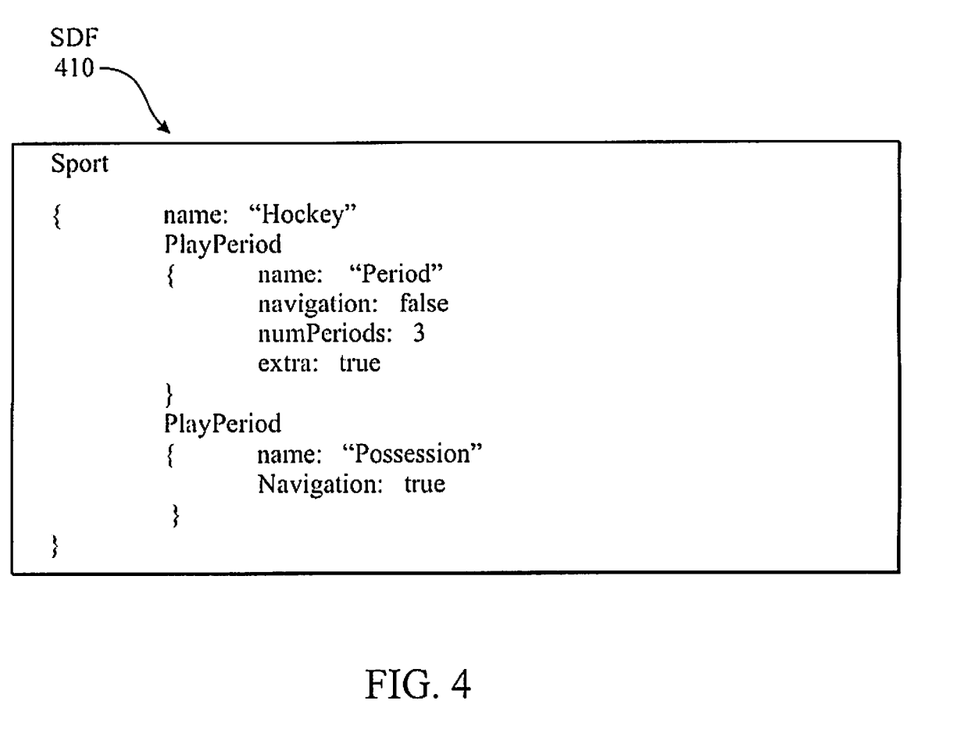
FIG. 4 illustrates an example partial fragment of a sport definition file.

Reference is now made to FIG. 3. FIG. 3 shows an analysis of the structure of three different sports: football, baseball, and volleyball. Each of these sports has a hierarchic time structure. For example, a baseball game has nine or more innings, each inning is divided into a top and a bottom half (one for each team), each top or bottom has three or more batters, and each batter gets three or more pitches. The sport definition file 210 may specify the organization for a particular sport. More specifically, the sport definition file 210 may include a hierarchy of play periods for a particular sport. Some, not necessarily all, of these play periods may be specified as units of navigation. For example a viewer of a baseball game can ask for next pitch, previous pitch, next batter, previous batter, next top/bottom or previous top/bottom. For each play period the sport definition file 210 may specify the name, how many of such periods there are, whether extra periods are allowed and is this period used for navigation. FIG. 4 shows a partial sport definition file 410 for the play periods in hockey.

There are also a variety of events that can occur during play. These events are of interest to fans and may be useful to select interesting plays for game summarization. In a sport definition file 210, each event type may be given a name and an optional value. The value may have a fixed value or an arbitrary value. For example, a field goal in American football is always three points. However, the yards gained on a particular play is an arbitrary value that must be entered after each play. Event definitions in the sport definition file 210 control the user interface that is presented in the annotator 212 while encoding an ongoing game.

Events can also be accumulated into statistics. Statistics are calculated from events and other statistics. An additive statistic begins at zero and after each play it adds the value of the corresponding event. Most scores, yards gained, pass completions, number of spikes, etc. fall into this category. There are also average, percentage and ratio statistics that aggregate two statistics or events into a single calculation.

A uniform viewing experience across all sports may be provided. For example, if a viewer has become adept interacting with baseball, it is desirable for the learning transfer for football season to be trivial. The user interface may be made to be completely consistent across sports because the player software 214 may be the same. This consistency with its corresponding learning transfer from sport to sport may be very advantageous in a relaxation/entertainment experience.

User interface consistency may also be important for the annotator software 212. The staff in the broadcast truck doing a basketball game on a given night may have worked a volleyball game earlier in the week and may be doing a soccer game the next day. The annotation process is time critical for live events, and familiarity with the tools may provide significant advantages.

Figure 5:
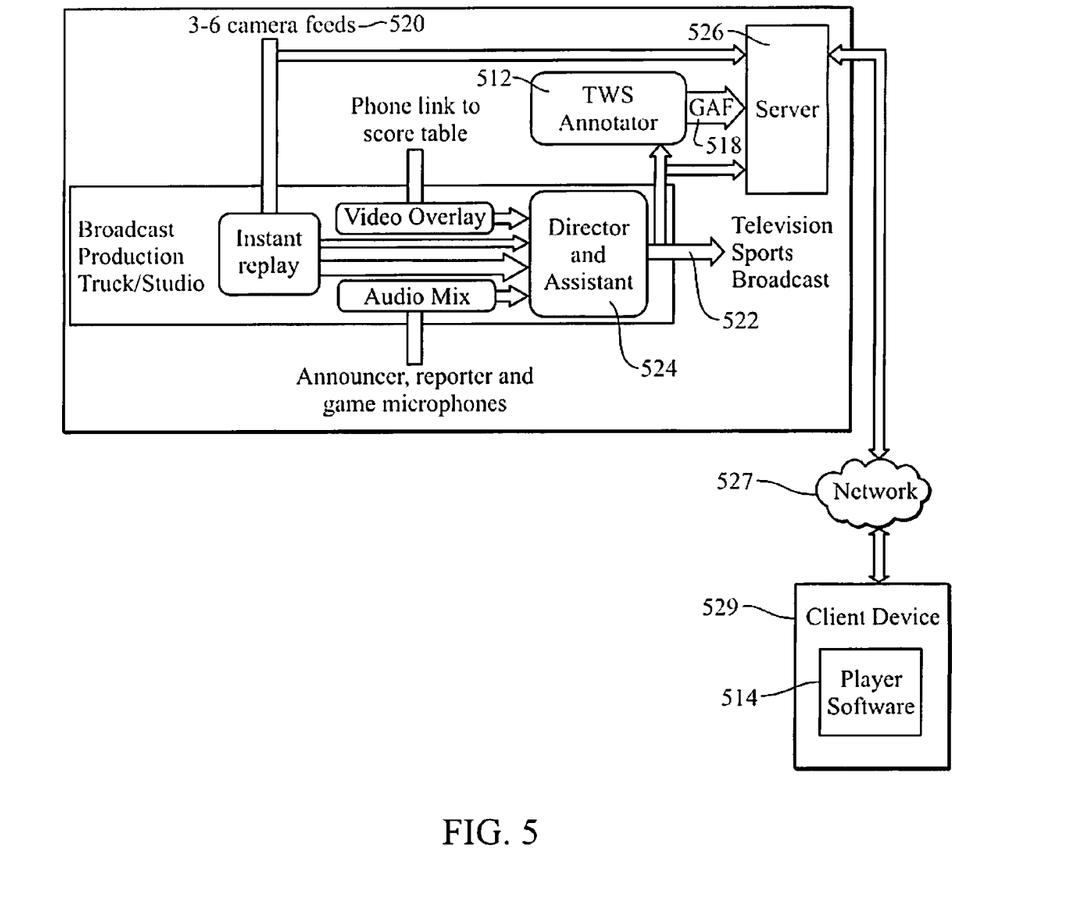
FIG. 5 illustrates an example of a workflow for producing an interactive sports viewing experience.

Reference is now made to FIG. 5. The raw camera feeds 520 and the broadcast feed 522 that comes from the director's station 524 may be digitally encoded and then ingested onto a network server 526. In addition, the broadcast feed 522 may be passed into the annotator software 512 where one or more staff members add the necessary annotation information to create the game annotation file 518 which may also be uploaded to the server 526. The audio track from the broadcast feed 522 may also be mixed into all of the other camera feeds 520 so that all video tracks may have the same audio.

The server 526 may be in electronic communication with multiple client devices via a network 527, such as the Internet. A single client device 529 is shown in FIG. 5. The client device 529 may be, for example, a television set-top box, a personal computer, etc. Player software 514 may be running on the client device 529. The player software 514 may retrieve the raw camera feeds 520, the broadcast feed 522, and the audio track from the broadcast feed 522 from the server 526.

For the initial setup of the game annotation process, the annotation operator may ask for the names and logos of the teams/players as well as the names of the camera views available for the game. The number of cameras may vary from game to game. Adding more cameras increases the potential for interesting shots, but also increases equipment and staff costs. This can vary depending upon the importance of the game to the intended audience. The annotator 512 may be used to add time markings for the start and end of each navigation unit described in the sport definition file 210.

The annotator 512 may be divided into two applications: one for marking navigation unit times and one for marking event information. These two applications may work in series with navigation annotations feeding into the event marking tool.

Figure 6:
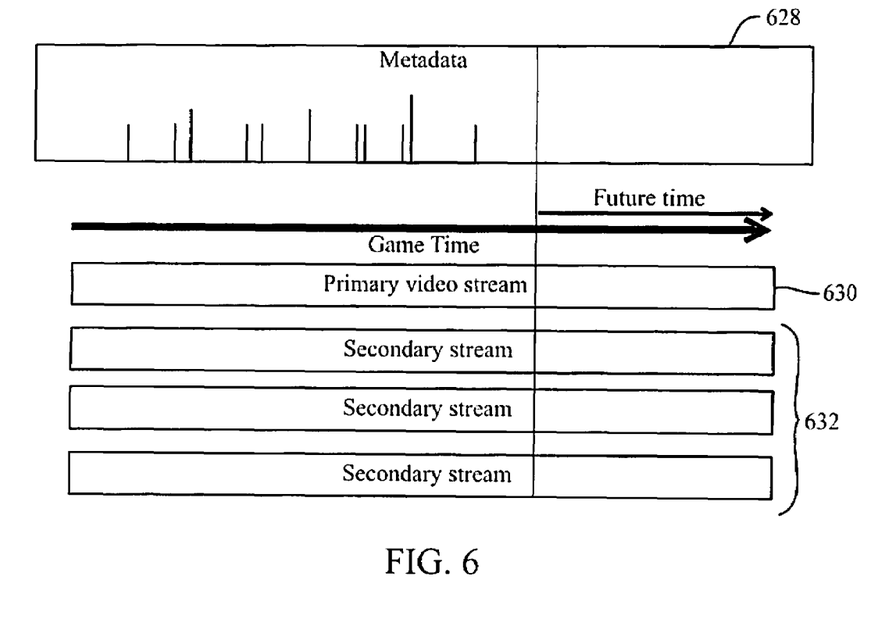
FIG. 6 illustrates an example relationship between a game annotation file, a broadcast feed, and multiple camera feeds.

Reference is now made to FIG. 6. FIG. 6 shows the relationship between a game annotation file 218 (which corresponds to the metadata 628 in FIG. 6), a broadcast feed 522 (which corresponds to the primary video stream 630 in FIG. 6), and multiple camera feeds 520 (which correspond to the secondary video streams 632 in FIG. 6). All of the camera feeds 520 (secondary video streams 632) as well as the mixed broadcast feed 522 (primary video stream 630) are time synchronized. Because of this synchrony the information in the game annotation file 218 (metadata 628) applies to all feeds.

Although the secondary video streams 632 have been described as corresponding to camera feeds 520, the scope of the present embodiments should not be limited in this regard.

Figure 7:
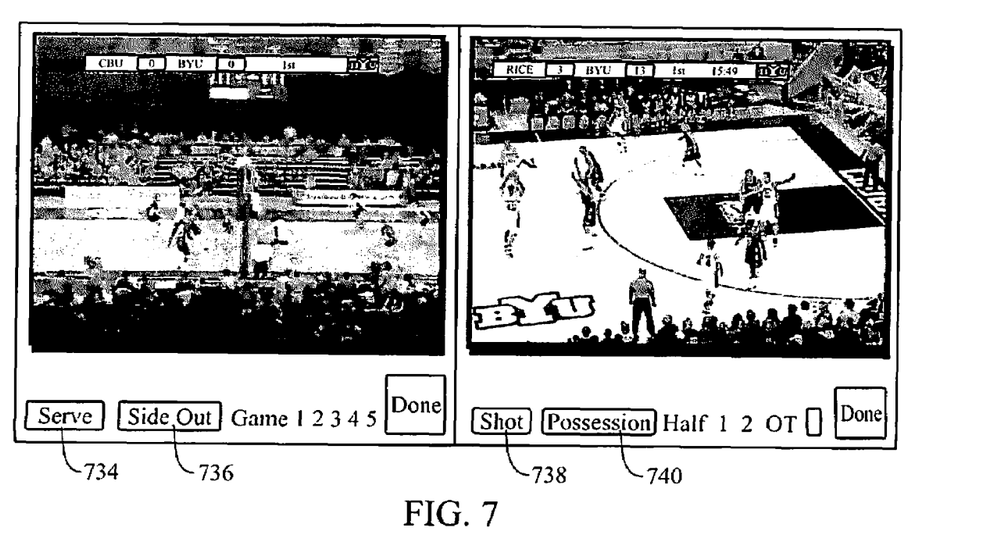
FIG. 7 illustrates examples of a navigation marking tool.

Reference is now made to FIG. 7. FIG. 7 shows the navigation marking tool specialized for volleyball and basketball. For volleyball, the annotation operator may use the "serve" button 734 and the "side out" button 736 to mark when a navigation unit starts and ends. For basketball, the person who is performing the annotation may use the "shot" button 738 and the "possession" button 740 to mark when a navigation unit starts and ends. The user interfaces for these tools may be automatically generated from the sport definition file 210 by the annotator software 212.

Figure 8:
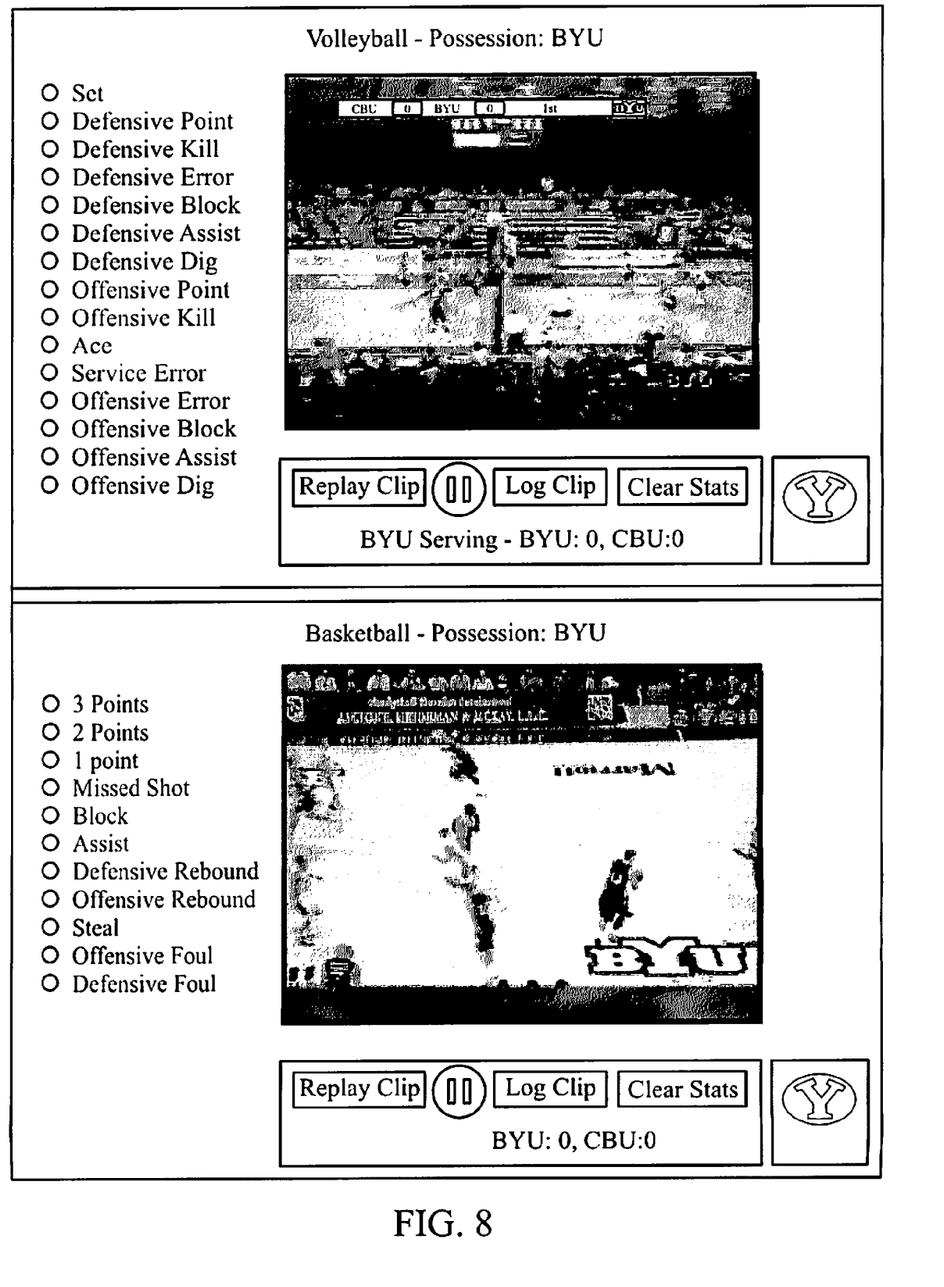
FIG. 8 illustrates examples of an event logging tool.

Reference is now made to FIG. 8. FIG. 8 shows the event logging tool for both volleyball and basketball. Once again, these user interfaces may be generated from the sport definition file 218. Down the left hand side is a list of all of the events that can occur and across the bottom is the current state of play. The annotation operator may simply click on the various events that have occurred within a play. On occasion an error may be made. In such cases, the annotation operator can pause the video and correct the selections. When the annotation operator logs the play clip, the video may immediately skip to the next clip. If a pause was required, the time may be recovered within the next play clip because it may take less time to record events than most plays require. Thus, the whole process may remain very close to live time.

As can be seen from FIGS. 7 and 8, tools for annotating sports experiences may be provided that are general (across sports) and can be readily specialized to a particular sport. This uniform tool structure across sports may simplify the production of an interactive sport experience.

Figure 9:
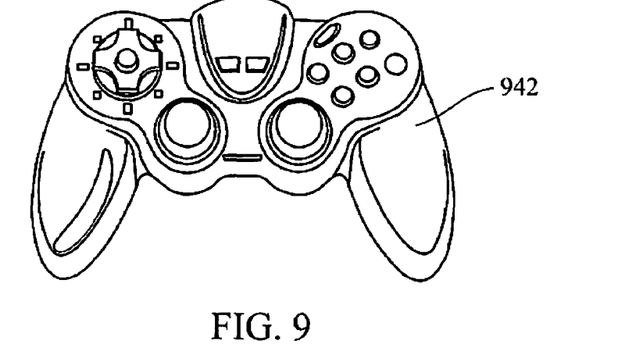
FIG. 9 illustrates an example of a controller that may be used.

Reference is now made to FIG. 9. FIG. 9 shows an example of a controller 942 that may be used. Other types of controllers may be used instead, such as a traditional remote control, a game controller of the style used in video games, a specialized interactive TV controller, etc. Alternatively still, a single special button on the controller 942 may be used to provide guidance in how to interact.

Figure 10:
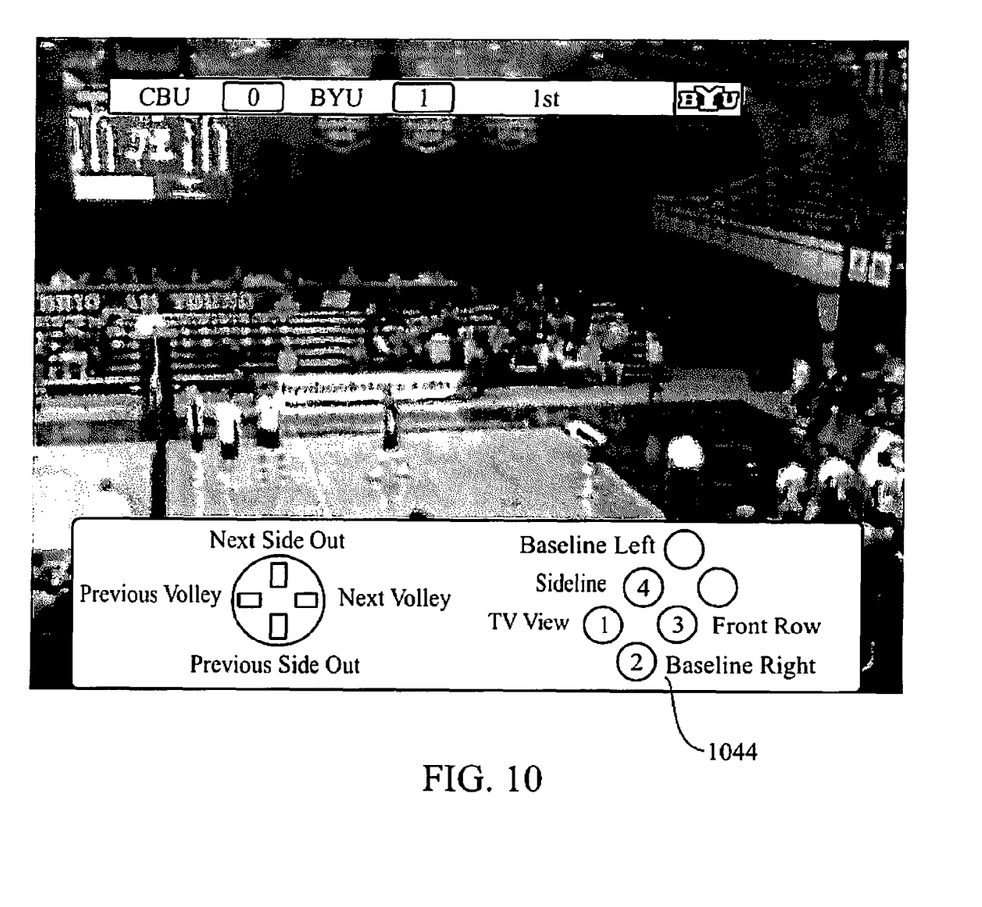
FIG. 10 illustrates an example of a control overlay that may be displayed on the screen during a sporting event.

Reference is now made to FIG. 10. FIG. 10 shows a control overlay 1044 displayed on the screen during a volleyball game. The control overlay 1044 may be displayed in response to the user pressing a trigger button on the controller 942. However, it is not necessary to display the control overlay 1044. User activation of a particular button on the controller 942 causes the corresponding function to be performed whether or not the control overlay 1044 is displayed. Thus, it may be said that the controller 942 provides a default menu (provided by the buttons on the controller 942) with optional visual assistance (provided by the control overlay 1044). The use of the displayed control overlay 1044 may be used to automatically train the sports user in how to interact with the common controls and smoothes the viewing experience.

The control overlay 1044 looks very much like the face of the controller 942 and has all of the functions labeled. Presenting a control overlay 1044 that visually corresponds to the physical controller 942 may greatly simplify the user's learning effort.

Under some circumstances, the player software 214 may be configured to work with different types of controllers 942. When a particular controller 942 is connected, the player software 214 may detect the type of controller 942 that is being used, and adapt the organization of the control overlay 1044 to the physical layout of the controller 942 that is being used. Thus, the user interface may be unique to the controller 942 that the user is holding. In addition, the user interface may be identical across sports.

Pressing any of the buttons on the controller 942 may cause a corresponding echo on the screen overlay 1044. The overlay 1044 may disappear when the trigger is released. Other trigger buttons may be pressed to show game statistics or other less popular controls that do not fit on the available buttons of the controller 942.

A key part of simplifying interactivity is to transfer learning across activities. The interactive techniques should be uniform across a given type of sport, such as football. In addition, interactions may be unified across diverse sports. The mappings of controls to input devices should be the same across football, baseball, basketball, volleyball, etc. Learning interaction on one sport should translate readily to another with little or no training. A uniform set of viewing actions that are universal across all sports may be defined, and these viewing actions may be mapped onto the controller 942 so that interactive behavior learned in viewing one sport is transferred to another.

Figure 11:
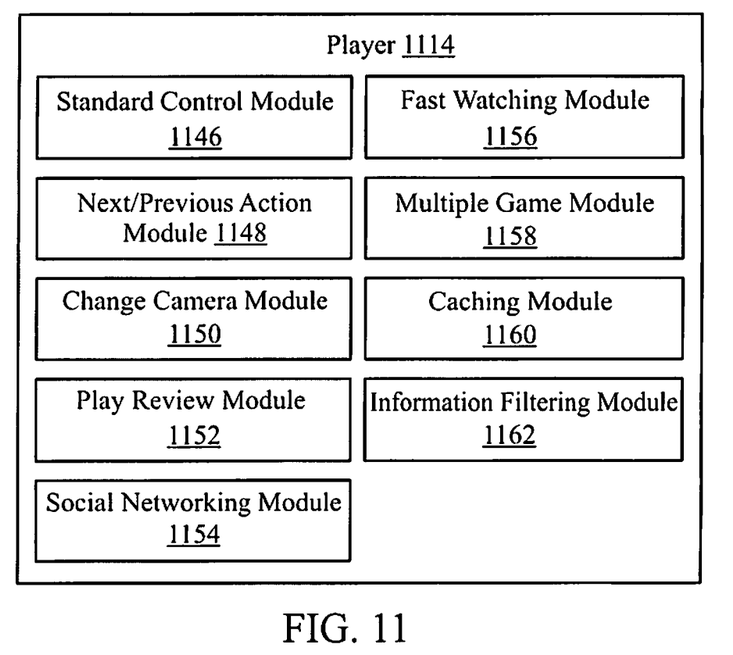
FIG. 11 illustrates various modules that may be implemented in the player in order to provide viewer controls.

Reference is now made to FIG. 11. FIG. 11 illustrates various modules that may be implemented in the player 1114 in order to provide viewer controls. The modules include a standard controls module 1146 (for providing standard controls such as fast-forward, rewind, slow motion, pause, play, audio volume, mute, etc.), a next/previous action module 1148, a change camera module 1150, a play review module 1152, a social networking module 1154, a fast watching module 1156, a multiple games module 1158, a caching module 1160, and an information filtering module 1162.

The next/previous action module 1148 will now be discussed. A hierarchy of game events may be defined, and the viewer controls may include accompanying next and previous actions, such as next play, previous play, previous first down, start of quarter, start of game, etc. A large set of sports can be broken into a similar set of periods and associated with standard interactive actions, as shown in FIG. 3.

To provide the next/previous action controls, the next/previous action module 1148 may be configured to rapidly (e.g., in two seconds or less) change the play head of the video stream to any time offset. The game annotation file 218 may include the time offsets for the start and end of any navigation unit defined in the sport definition file 210. The next/previous action module 1148 may provide the user with the ability to control when instant replay is displayed. For example, if a user selects "Previous Play" in a football game, the next/previous action module 1148 may retrieve the current offset 102 and then look in the game annotation file 218 for the time for the play that occurred immediately before the current offset 102. The next/previous action module 1148 may then go to that time in the video stream. A typical game annotation file 218 includes a few hundred annotations, so a simple search of this data structure would be more than fast enough to respond to user input in a timely way.

The change camera module 1150 will now be discussed. The change camera module 1150 may be configured to rapidly (e.g., in two seconds or less) change camera angles in response to user input. In addition, the change camera module 1150 may be configured to automatically restart a play when a user switches camera angles. More specifically, when the viewer selects a new camera feed 520, the player software 214 may be given the network identifier necessary to locate that camera's video stream and the offset of the start of the previous play unit. To the viewer, switching camera angles may feel like instant replay from a new view.

The play review module 1152 will now be discussed. The review of play is an example of a specialized form of interactive navigation. In many situations a fan may desire to carefully look at a given sequence of play. This may be to review the call of a foul that the fan disputes, to savor a particularly elegant display of athletics or to understand an unexpected turn of events. The play review module 1152 may permit a user to interactively select a different camera view while reviewing a play. The play review module 1152 may also permit the integration of slow motion (i.e., displaying at least a portion of a play in slow motion), pause and single frame (i.e., stepping through at least a portion of a play frame-by-frame) with the multiple camera views.

A special "review mode" may be defined. While in review mode, the user may change to secondary video streams 632 without changing play time by means of a single user action. This may allow the user to switch among camera views at will. The user may enter "review mode" either implicitly via a "pause" button on the controller 942 or explicitly with a review button. When entering review mode the play review module 1152 may save the current time, thereby creating a special time mark in addition to the event marks maintained in the metadata 628. This time mark allows for a special "return to mark" action. This mark in conjunction with camera switching and other navigation may allow the user to finely select a time that can be repeatedly reviewed from various viewpoints and excitedly discussed among all the fans in the room.

It may be desirable to insert advertisements at points in time that are the least disruptive to the user's entertainment experience. When a user exits review mode, the play review module 1152 may be configured to interpret this as an indicator of a break in the game flow, and therefore as an appropriate location for an advertisement to be inserted.

The social networking module 1154 will now be discussed. Suppose that a viewer wants to tell a friend about a play. The social networking module 1154 may be configured to provide a quick, easy mechanism for specifying the play in question without resorting to video editing techniques such as single frame adjustment or interactive "scrubbing." Such effort breaks the flow of the game experience as well as the information sharing experience.

Suppose for example a user sees a play that he feels was incorrectly officiated, and he sends the message "bad call" into cyberspace. However, the user's initiation of the message occurs after the call was made. The play in question has already occurred. The events in the metadata 628 may be used to automatically select a clip (time period) from game play that is best associated with the message. This greatly simplifies the effort of generating interesting sports-based messages to be shared with friends. The necessary information to generate such a clip is already encoded in the game metadata 628 that has been described.

The selected clip can be defined as between the current time and the time of the most recent event (for example "start of play"). More specifically, when a user's request to send a message is detected, the current time (i.e., the point in time when the user's request is made) may be determined. In addition, event information in the metadata 628 may be used to determine the starting time for the current play. Then, a video clip to accompany the user's message may be automatically selected. The video clip may begin at the starting time for the current play, and the video clip may end at the current time.

The social networking module 1154 may be configured to delay message reception until the receiving user has experienced the relevant point in the game. If, for example, two friends are watching an interactive version of the same game in different parts of the country, the interactivity will almost guarantee that they are not watching the same game play at the same time. If one user initiates a message about a play that then arrives before the other user has seen the play, the excitement of the game may be destroyed by revealing information too soon.

The social networking module 1154 may be configured to delay message reception (perhaps showing an indication of future messages) until the appropriate game play has been viewed by the recipient. For example, when a message is received, a determination may be made about what point in the game the message corresponds to. This may involve comparing the current time (i.e., the point in the game that the user is currently watching) with a timestamp that is associated with the received message. If it is determined that the recipient of the message has not seen the point in the game that the message corresponds to, then the display of the message may be delayed until the recipient of the message has seen the relevant point in the sporting event. In addition, an indication may be displayed of where in the game the message is located, and a recipient can interactively choose to immediately go to the point of play indicated by the message. Also, after the message is viewed, feedback may be provided to the user that initiated the message, indicating that the message has been delivered.

In the context of the present discussion of social networking, the term "message" should be interpreted broadly to include an email message, an instant message, a text message, a post to a blog, a post to a social networking website (e.g., Facebook®), etc.

The fast watching module 1156 will now be discussed. The fast watching module 1156 may be configured to permit a user to watch an abbreviated version of a game. This may be desirable when a user has a limited amount of time to watch a particular game, or when a user starts a game late and wishes to catch up to live time without losing any of the interesting parts of the game. The amount of time that the user wants to spend can vary widely from user to user as well as the portion of the game to be accelerated. The abbreviated version of a game may be computed dynamically for each user.

This dynamic abbreviation of a game can be addressed in two parts: computing "degree of interest" and summarization. First, it may be assumed that given the metadata 628, the video can be partitioned into "game units". A game unit may correspond to a particular play, a possession of the ball, time between plays (as in football), etc. The summarization process may include selecting game units to be presented and interspersing "elision information" when game units are skipped. The selection of a game unit may depend on a DOI (degree of interest) function that may be applied to each game unit.

A user may specify the time that he has available and the portion of the game that he wishes to be abbreviated. This might take the form of "bring me to live game time within 15 minutes" or "show me the second half of the game in 20 minutes." Given the game time to be shown and the available time, game units with the lowest DOI value may be removed until the video time is reduced to within the user's available time.

One problem in game abbreviation is the computation of the DOI function. The exact nature of this function will vary from sport to sport. To compute the DOI of a given game unit, there should be a set of feature parameters that are known about the game unit and can be used as inputs to the DOI function.

The fast watching module 1156 may be configured to use statistics about other users' behavior as input features to a DOI function. Because the present disclosure proposes interactive viewing of sports video over the Internet, the interactive behavior of people experiencing a game may be logged. For example, if most users skipped over a game unit, then its DOI should be lower. If many users replayed a game unit, switched camera angles a lot, or played the unit in slow motion, the DOI for that unit should be higher. This information about past viewer behavior can be used as part of the inputs to a DOI function for some present or future viewer.

Of particular interest as features would be game units for which the user initiated some social networking activity such as sending a message or blogging a comment. For example, one or more users' participation in a social networking activity during a particular game unit may be interpreted as indicating an increased level of interest in that game unit. The more users that participate in a social networking activity during the game unit, the higher the level of interest. Then, the increased level of interest may be considered when dynamically abbreviating the game for a particular user. More specifically, the increased level of interest may make it less likely that the game unit will be one of the game units that is removed in order to shorten the video time to the user's available time.

The multiple games module 1158 will now be discussed. With popular sports there are frequently multiple games being played simultaneously. The multiple games module 1158 may permit a user to switch between games without losing his place in either game. When switching into a game, the user may be returned to a point of interest so that the switch makes sense. The point of interest may be the user's previous location in the game or the start of the relevant play prior or subsequent to the user's previous location in the game. Transition information derived from the metadata 628 may be provided to show what the game state is (e.g., yardage, score, powerplay, etc.). This may help the user to retain context in each game when moving among multiple games. When returning to a game the user can also use the DOI-based skipping to move more rapidly through the plays they missed while watching another game.

The caching module 1160 will now be discussed. In the interactive model for watching video sports disclosed herein, the viewer does not necessarily watch straight through the game. The viewer can select what the next video to be watched will be. This interactivity runs counter to the caching strategies that most Internet video technologies use to prevent gaps and skips in the viewing experience. However, with annotated sports the target times of interactive events are highly focused. At any point in the video there are only a small number of control events that the viewer can perform: "next play", "replay", "replay slow", "switch camera and replay" to name a few. The current caching strategy for internet video is to try to retrieve many frames ahead of the current frame.

With an interactive behavior of the type disclosed herein, not only is the next frame highly likely but also the user may request a skip to one of N alternative next frames, where N is small. The set of alternative frames is also coherent across many frames in the straight video sequence. For example, the target frame for "next play" remains unchanged across an entire play. This interactive structure can be exploited by the caching strategy. There are two cases for alternative next frames: skip back and skip forward.

In the skip forward case the alternative next frame is some time in the video future. In most cases this is not a distant future such as hours or even tens of minutes. In most sports the skip forward cases are less than 10-500 seconds. Once a particular skip forward event becomes possible (as known from the interactive structure of the user interface) the player 1114 can start locally caching those future frames by prefetching them over the network. More specifically, the player 1114 may determine, based on the interactive structure of the user interface, which skip forward events are possible. For example, in the context of football, suppose that the user interface allows three skip forward events: next play, next possession, and next quarter. Then the player 1114 may prefetch the frames that correspond to the next play, the frames that correspond to the first play (or the first few plays) of the next possession, and the frames that correspond to the first play (or the first few plays) of the next quarter.

It should be noted that this prefetching strategy is not merely a matter of prefetching a continuous segment of frames. For example, there may be a gap between the next play and the next possession. The player 1114 may prefetch the frames that correspond to the next play and the first play (or first few plays) of the next possession, without prefetching any frames between the next play and the next possession.

Whenever the frames that correspond to a particular skip forward event change, then the new frames that correspond to that skip forward event may be prefetched. For example, when the user finishes watching the current play, then the next play becomes the current play, and there is a new next play. At this point, frames that correspond to the new next play may be prefetched.

If the user executes an interactive input that targets that skip forward location then there is not a pause or a degradation of video quality because the frames are already cached and available. If the user does not execute the skip forward then eventually the video will reach those frames and play them. Thus no real Internet bandwidth is wasted. In fact, because those frames are already loaded, the time can be used for other predictive caching of frames.

In the skip back case there are only a few such locations in time. In the case of "replay," for example, the target frame for the replay is known and has already been seen by the viewer. Frames immediately following such a target can be retained in the cache for as long as that target can potentially be selected by the viewer. If those frames are not discarded then replay can begin instantaneously and at full fidelity. All of the frames within a "play" need not be retained but only those immediately following the target frame at the start of the play. Enough frames should be retained so that the playback can be restarted smoothly while other discarded frames are retrieved over the network.

Because the interactive behavior of viewers is known by the server that is distributing the interactive video, it is possible to log statistics of how often particular interactive actions are taken during specific video segments. The behavior of previous viewers of the game can be used to improve the allocation of caching resources towards those frames that are most likely. It is thus easy to adapt the caching strategy to the most likely behavior. For example viewer data may show that 10% of the time viewers will replay a play and 60% of the time they watch straight through and 30% of the time they skip to the next play. This information can improve cache hit performance. For a particular highly controversial play, however, the data may show that replay was selected 80% of the time. This play-by-play knowledge of the interactive behavior of previous viewers can focus scarce caching bandwidth to create a smooth interactive experience.

The information filtering module 1162 will now be discussed. In some situations, a user may request (e.g., by pressing a button on the controller 942) that certain information related to the game (e.g., rules, statistics, etc.) be displayed. The information filtering module 1162 may be configured to filter the information that is displayed to the user based on what happened during the previous play. What happened during the previous play may be determined by reference to the metadata 628 described earlier. For example, suppose that the user is watching a football game, and he requests that rules be displayed. If the previous play involved a pass interference penalty, then the rules may be filtered so that only the rules relevant to pass interference are displayed.

Figure 12:
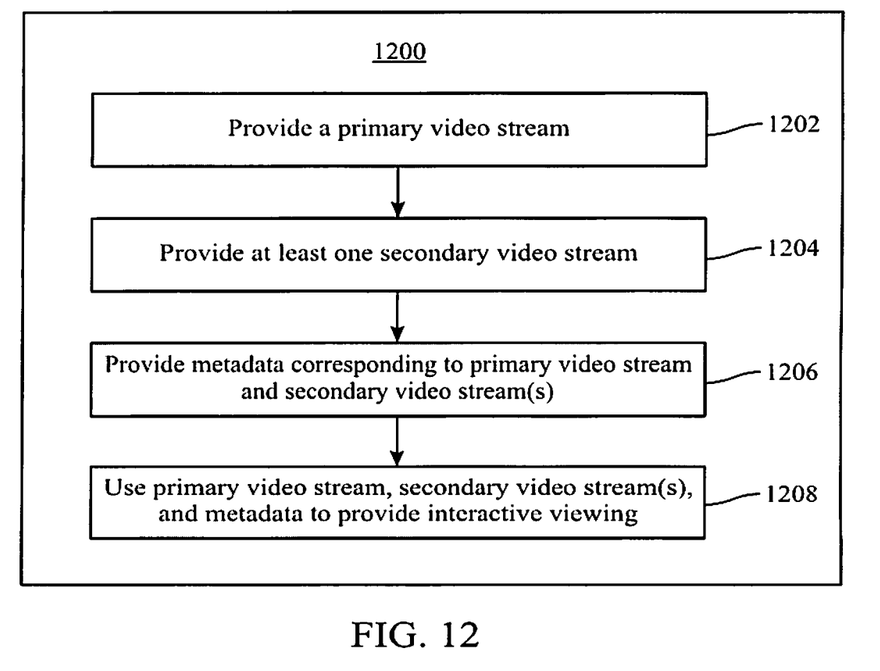
FIG. 12 illustrates a method for providing interactive viewing of a sporting event.

Reference is now made to FIG. 12. FIG. 12 illustrates a method 1200 for providing interactive viewing of a sporting event. The method 1200 includes providing 1202 a primary video stream 630 of the sporting event, providing 1204 at least one secondary video stream 632 of the sporting event, and providing 1206 metadata 628 corresponding to the primary video stream 630 and the secondary video stream(s) 632. The method 1200 also includes using 1208 the primary video stream 630, the secondary video stream(s) 632, and the metadata 628 to provide interactive viewing of the sporting event.

Figure 13:
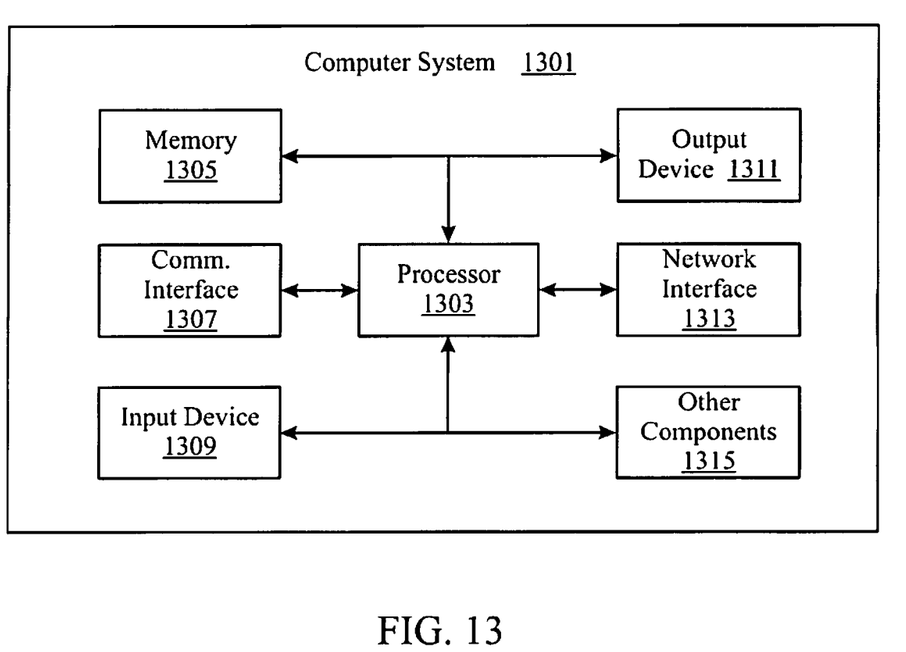
FIG. 13 illustrates various components that may be utilized in a computer system.

Reference is now made to FIG. 13. FIG. 13 illustrates various components that may be utilized in a computer system 1301. One or more computer systems 1301 may be used to implement the various methods disclosed herein. For example, one or more computer systems 1301 may be utilized to implement the server 526. Also, one or more computer systems 1301 may be utilized to implement the client device 529. The illustrated components may be located within the same physical structure or in separate housings or structures. Thus, the term computer or computer system 1301 is used to mean one or more broadly defined computing devices unless it is expressly stated otherwise. Computing devices include the broad range of digital computers including microcontrollers, hand-held computers, personal computers, servers, mainframes, supercomputers, minicomputers, workstations, and any variation or related device thereof.

The computer system 1301 is shown with a processor 1303 and memory 1305. The processor 1303 may control the operation of the computer system 1301 and may be embodied as a microprocessor, a microcontroller, a digital signal processor (DSP) or other device known in the art. The processor 803 typically performs logical and arithmetic operations based on program instructions stored within the memory 1305. The instructions in the memory 1305 may be executable to implement the methods described herein.

The computer system 1301 may also include one or more communication interfaces 1307 and/or network interfaces 1313 for communicating with other electronic devices. The communication interface(s) 1307 and the network interface(s) 1313 may be based on wired communication technology, wireless communication technology, or both.

The computer system 1301 may also include one or more input devices 1309 and one or more output devices 1311. The input devices 1309 and output devices 1311 may facilitate user input. Other components 1315 may also be provided as part of the computer system 1301.

FIG. 13 illustrates only one possible configuration of a computer system 1301. Various other architectures and components may be utilized.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented via one or more instructions on a computer-readable medium. The term "computer-readable medium" refers to any tangible storage medium that can be accessed by a computer. By way of example, and not limitation, a computer-readable medium may comprise RAM, ROM, EEPROM, CD-ROM or other optical disk storage, magnetic disk storage or other magnetic storage devices, or any other tangible storage medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for providing interactive viewing of a sporting event, comprising:
   accessing a plurality of video streams of the sporting event, including a primary video stream and at least one secondary video stream;
   accessing metadata corresponding to the primary video stream and the at least one secondary video stream, wherein the metadata identifies time points in the plurality of video streams; and
   using the primary video stream, the at least one secondary video stream, and the metadata to provide interactive viewing of the sporting event;
   wherein providing interactive viewing of the sporting event comprises:
      providing a sport definition file that specifies an organization for a particular sport via a plurality of play period definitions, wherein each play period definition comprises a name field that indicates a name of a play period and a navigation field that indicates whether the play period can be used for navigation; and
      using the sport definition file to specialize a user interface of player software that presents the sporting event to a viewer.

2. The method of claim 1, wherein the navigation field of at least one play period definition indicates that the play period cannot be used for navigation.

3. A method for providing interactive viewing of a sporting event, comprising:
   accessing at least one video stream of the sporting event;
   accessing metadata corresponding to the at least one video stream, wherein the metadata identifies time points in the at least one video stream; and
   using the at least one video stream and the metadata to provide interactive viewing of the sporting event;
   wherein providing interactive viewing of the sporting event comprises:
      defining an interactive structure of a user interface derived from a sport definition file that specifies organization for a particular sport via a plurality of play period definitions, wherein the interactive structure of the user interface defines a specific plurality of future frames that are targets of skip forward interactive actions associated with a current frame;
identifying a plurality of skip forward interactive events that are defined by the interactive structure of the user interface;
prefetching future frames that correspond to the skip forward interactive events that are defined by the interactive structure of the user interface, wherein prefetching future frames comprises determining when target frames corresponding to a particular skip forward interactive event have changed and prefetching new frames for that skip forward interactive event whenever the target frames have changed; and
locally caching the prefetched future frames;
wherein the steps of prefetching the future frames and locally caching the prefetched future frames are performed prior to a user executing an interactive input that targets any of the skip forward interactive events;
wherein there is a gap between the current frame and the prefetched future frames; and
wherein the future frames are prefetched without prefetching all of the frames between the current frame and the future frames.

4. A method for providing interactive viewing of a sporting event, comprising:
accessing at least one video stream of the sporting event;
accessing metadata corresponding to the at least one video stream, wherein the metadata identifies time points in the at least one video stream; and
using the at least one video stream and the metadata to provide interactive viewing of the sporting event;
wherein providing interactive viewing of the sporting event comprises:
defining an interactive structure of a user interface derived from a sport definition file that specifies organization for a particular sport via a plurality of play period definitions, wherein the interactive structure of the user interface defines a specific plurality of past frames that are targets of skip backward interactive actions associated with a current frame;
identifying a plurality of skip backward interactive events that are defined by the interactive structure of the user interface;
retaining frames in a cache that have previously been played but that are still potential targets of at least one of the plurality of skip backward interactive events, wherein retaining frames for a particular skip backward interactive event comprises retaining some but not all of the frames corresponding to the skip backward interactive event; and
discarding the frames when they are no longer potential targets of any of the plurality of skip backward interactive events.

5. The method of claim 4, wherein the frames that are retained for the skip backward interactive event comprise a starting frame for the skip backward interactive event and at least one additional frame that immediately follows the starting frame.

6. A method implemented in a client device for providing interactive viewing of a sporting event, comprising:
accessing a plurality of video streams of the sporting event, including a primary video stream and at least one secondary video stream;
accessing metadata corresponding to the primary video stream and the at least one secondary video stream, wherein the metadata identifies time points in the plurality of video streams; and
using the primary video stream, the at least one secondary video stream, and the metadata to provide interactive viewing of the sporting event;
wherein providing interactive viewing of the sporting event comprises:
defining an interactive structure of a user interface derived from a sport definition file that specifies organization for a particular sport via a plurality of play period definitions, wherein each play period definition comprises a name field that indicates a name of a play period and a navigation field that indicates whether the play period can be used for navigation; and
using statistics derived from interactive choices of previous viewers, based on the interactive structure of the user interface, that indicate how often particular interactive actions have been taken during specific video segments during other users' prior viewing of the sporting event to prefetch frames to be cached in advance in the client device when caching bandwidth is scarce; and
wherein the statistics derived from the interactive choices of previous viewers indicate which frames are most likely to be targets of interactive actions.

* * * * *